March 12, 1957  J. A. PAULIUS, JR., ET AL  2,784,934
VALVE ACTUATING MECHANISM OR THE LIKE
Filed Dec. 11, 1952  3 Sheets-Sheet 1
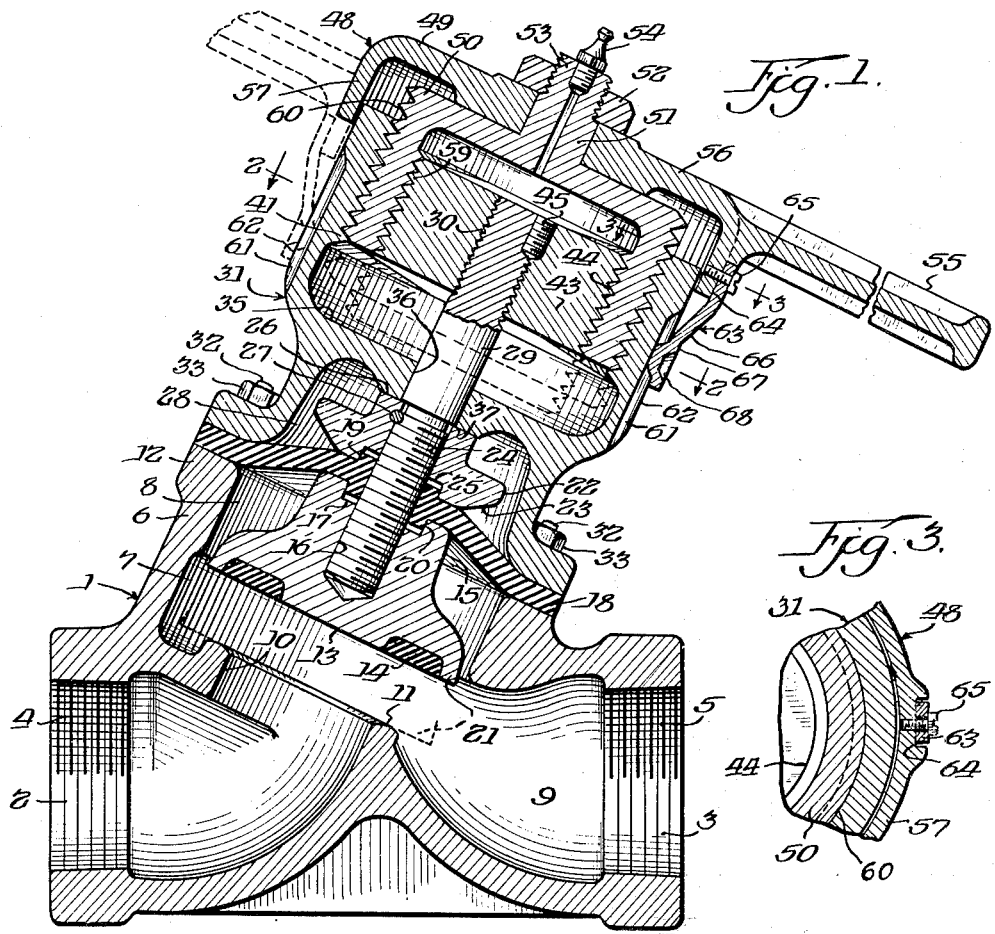
Fig. 1.
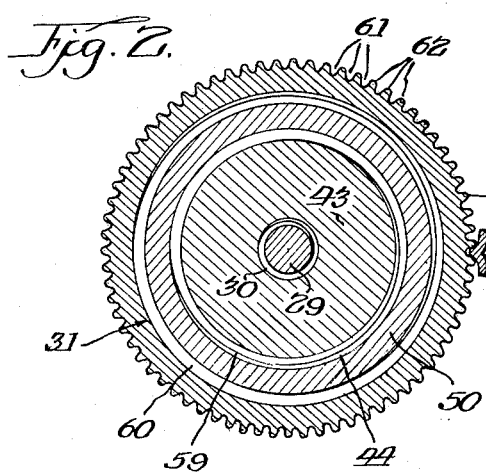
Fig. 2.
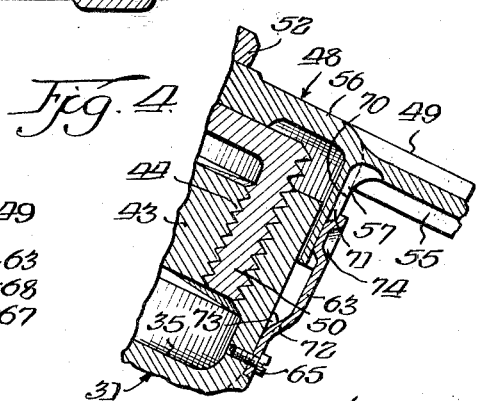
Fig. 3.
Fig. 4.
Inventors.
John A. Paulius, Jr.
George Brown, Jr. &
Frank D. Cotterman,
By Joseph O. Longe Atty.

March 12, 1957 J. A. PAULIUS, JR., ET AL 2,784,934
VALVE ACTUATING MECHANISM OR THE LIKE
Filed Dec. 11, 1952 3 Sheets-Sheet 2

Inventors.
John A. Paulius, Jr.,
George Brown, Jr. &
Frank D. Cotterman.
By Joseph O. Pange
Atty.

March 12, 1957    J. A. PAULIUS, JR., ET AL    2,784,934
VALVE ACTUATING MECHANISM OR THE LIKE
Filed Dec. 11, 1952    3 Sheets-Sheet 3

Inventors.
John A. Paulius, Jr.,
George Brown, Jr., &
Frank D. Cotterman.
By Joseph O. Lang, Atty.

United States Patent Office 2,784,934
Patented Mar. 12, 1957

2,784,934

VALVE ACTUATING MECHANISM OR THE LIKE

John A. Paulius, Jr., Chicago, George Brown, Jr., Blue Island, and Frank D. Cotterman, La Grange, Ill., assignors to Crane Co., Chicago, Ill., a corporation of Illinois Application December 11, 1952, Serial No. 325,348

3 Claims. (Cl. 251—265)

This invention relates to a valve actuating mechanism or the like, and more particularly, it is concerned with a novel arrangement for quick-opening diaphragm valves including means to prevent self-opening of the valve and to permit setting for throttled or open position and maintenance of the setting without change due to objectionable self-rotation.

It is therefore one of the more important objects of this invention to provide a locking arrangement in diaphragm valve wherein the latter can be fully opened or closed by rotation of the handle and actuating stem in approximately 180 degrees.

A further object is to provide a valve with novel actuating mechanism for effecting quick opening of the closure member thereof.

A still further object is to provide a quick-opening diaphragm valve which can be easily and conveniently throttled at desired positions and prevented from self-opening when in the closed position or from accidentally closing from the open position.

Another object is to provide in a valve of the type referred to means for effectively locking the same in closed, open, or any intermediate position, and without hindering or interfering with the normal operation of the valve.

Other objects and advantages of the invention will become more readily apparent upon proceeding with the specification read in light of the accompanying drawings, in which:

Fig. 1 is a sectional assembly view of a quick-opening diaphragm valve embodying our invention.

Fig. 2 is a sectional view taken on the line 2—2 of Fig. 1.

Fig. 3 is a view of a fragmentary section taken on line 3—3 of Fig. 1.

Fig. 4 is a sectional view of a fragmentary portion of a slightly modified form.

Similar reference numerals refer to similar parts throughout the several views.

Figure 5:
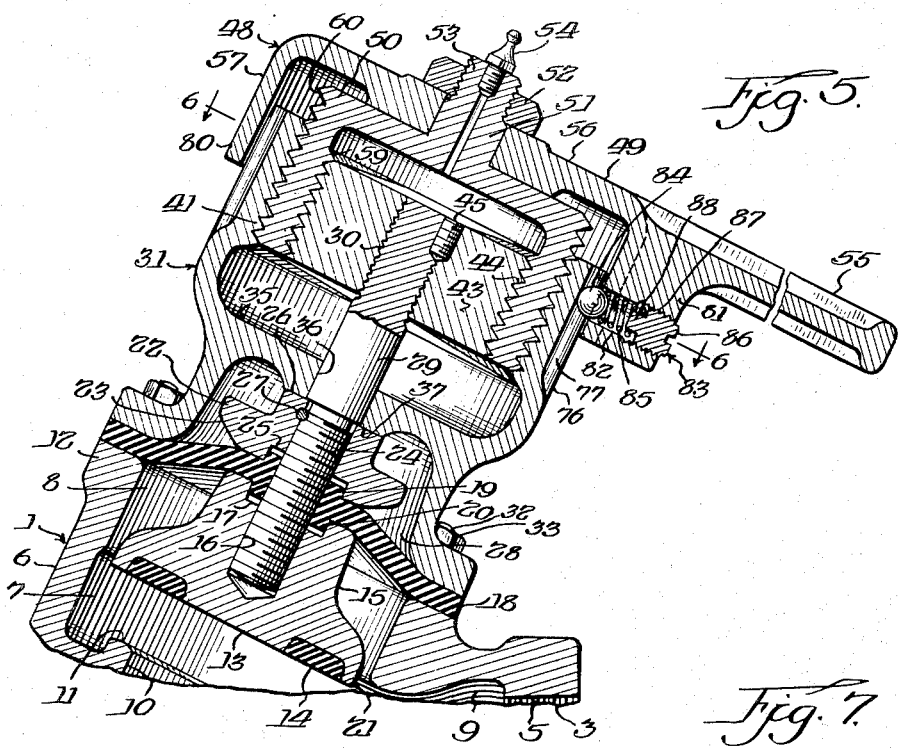
Fig. 5 is a fragmentary sectional view of another modified form.

Referring now to Figs. 1 to 3 inclusive, the valve body generally designated 1 is provided with the usual inlet and outlet passages 2 and 3 respectively, threaded as at 4 and 5 for attachment to a fluid pipe line, not shown. An upper portion 6 thereof is preferably, although not necessarily, inclined with respect to the rest of the body and provides an inclined chamber 7 having a cylindrical upper portion 8 and a lower portion of substantially the same diameter except for an enlargement or extension to one side at 9 forming a passageway for fluid flow to the exterior of the valve through the outlet 3. A flexible diaphragm 18 which may be made of rubber or any suitable composition defines the upper limits of the valve chamber 7, the outer annular portion of the diaphragm being held in clamped pressure sealed relation against the flange 12 of the body by the bonnet 31 which is mounted thereon and secured around the valve chamber by suitable means, such as the studs 32 and nuts 33, the bonnet and the hollow interior thereof being inclined at the same angle as the upper portion 6 of the body.

A valve disc or closure member 13 having a composition or resilient insert 14 for seating contact is contained within the valve chamber 7, and being secured to the lower end of a valve stem 29 passing through the diaphragm as by threading at 16. A plunger member 22 is also attached to the valve stem by means of threading as at 24 and is prevented from turning by a locking pin 27. The plunger member has a convex lower surface 23 which is arranged to support the greater portion of the diaphragm when the valve is in the closed position. Both the plunger member 22 and the valve disc closure member 13 have annular recesses 25 and 17 respectively for reception of the upper and lower peripherally beaded portions 19 and 20 respectively of the diaphragm, the plunger member and valve disc securely clamping the interposed diaphragm to the valve stem 29 in sealed or fluid tight relation therewith, the valve stem being held against rotation by such clamping together with the outer peripheral securement of the diaphragm mentioned above.

The valve body 1 is formed with a ported bridge wall or annular seat 10 having a rounded valve seating surface 11 and being inclined at the same angle as the upper body portion 6 and the valve stem and closure member therein for fluid tight engagement with the annular insert 14 of the latter member when in the lowermost or closed position indicated by means of the dotted lines.

The valve disc or closure member 13 is circular in cross section, the lower portion 21 of which is snugly received within the cylindrical upper portion 8 of the valve chamber when the closure member is fully raised or in the valve open position. This member has a reduced upper portion 15 for reception within the hollow chamber portion 28 of the bonnet during said open position and reduced contact with the underside of the diaphragm 18 when so raised.

The bonnet, generally designated 31, is provided with an inclined partition 35 centrally apertured at 36 for lateral support and sliding reception of the valve stem 29. The aperture 36 may be shaped to receive a polygonal or lugged valve stem for instance to further insure against rotation thereof, if desired. The lower surface 37 of the partition provides for abutting contact by the flat upper end 26 of the plunger for limiting the upper movement of the valve stem and closure member.

The bonnet is open at the upper end, being of cylindrical form adjacent the opening. The valve stem 29 is provided with an enlarged end portion 43 which is illustrated in the drawing as a separate member threadedly received at the upper end of the stem at 30 and locked against relative rotation with respect thereto by a set screw 45. This portion, however, may be formed integral with the stem and in any event is threaded around the outer periphery thereof at 44 for the purpose hereinafter explained.

A rotatable actuating assembly, generally designated 48, is disposed over the open end of the bonnet 31 or more particularly of the upper cylindrical portion thereof. This assembly comprises a handle member 49 and a threaded piece 50 of inverted cup shape which may be either formed integral with the handle member or separate for attachment thereto, such as shown in the drawing. In the latter case, the threaded piece or cup-shaped member 50 is provided with a handle square 51 for reception within the handle member and a threaded extension 53 for securement to the handle member as by locknut 52. A grease gun fitting 54 is preferably provided for purposes of supplying internal lubrication thereto.

The cup-shaped member 50 has inner and outer peripheral portions 59 and 60, respectively which are concentrically threaded in opposite directions for engagement with the peripheral threading 44 of the enlarged end portion 43 of the valve stem and threading 41 around the inside or inner periphery of the cylindrical upper portion of the bonnet, respectively. The handle member 49 is formed into a transversely extending lever handle 55 which provides for manual rotation of the cup-shaped threadpiece 50 through the handle square 51 to reciprocally move the valve stem 29 and to actuate the closure member secured thereto through cooperative engagement with the bonnet threading 41, the direction of endwise movement of the stem and closure member, of course, depending upon the direction of rotation of the handle member and threadpiece. In order to effect complete opening or closing of the closure member with only about 180 degrees of rotation of the lever handle, right-hand quick threading has been provided between the cup-shaped member and bonnet and left-hand quick threading between the cup-shaped member and the enlarged end portion of the valve stem. The quick threading may be of any suitable type and may be multiple, if desired.

The rotatable handle member 49 is provided with an annular skirt 57 depending from the outer edge of the hub portion 56. The latter member extends beyond or overlaps the opening in the top of the bonnet or the cylindrical upper portion thereof, the skirt portion extending around the outer periphery of the bonnet or cylindrical portion and being uniformly spaced from the outer peripheral portion 60 of the cup-shaped threadpiece 50 to permit downward movement of the actuating assembly.

The lever handle and other movable parts are shown in dotted lines in Fig. 1 to indicate their respective positions in the closed valve position, the open valve positions being shown in full lines throughout the drawing figures.

Tests have disclosed that the present type of valve gives satisfactory service in its operation except for a slight opening or change of adjustment under severe line vibration, such as hammerblows applied adjacent the valve. In this connection, the upper part of the bonnet has frequently been made of larger diameter than the lower body attachment portion to enable the use of greater pitch diameter in the pick threading, and therefore reducing the tendency to turn. To prevent said self-rotation of the actuating assembly and eliminate the possibility of the closure member accidentally opening or closing or changing its position in intermediate or throttle setting, locking means have been devised in various forms engageable between the handle member and bonnet.

Figs. 1 to 3 inclusive of the drawings disclose a comparatively simple form of lock mechanism comprising a spring clip member generally designated 63 and which is secured at the upper end thereof to the skirt portion 57 of the handle member by means of a screw 65. The upper end portion is received within a recess 64 in the skirt to prevent objectionable side motion or canting of the spring clip member, thus affording more rigid attachment to the handle member. The clip member is offset at 66 and has a depending portion 67 provided with a tooth or projection 68 at the lower end thereof formed by pressing or otherwise providing for engagement within the recesses or grooves 61 between serrations 62 extending around the outer peripheral portion of the bonnet or cylindrical upper portion thereof adjacent the open top of the same.

This clip member by virtue of the tooth engagement above described and providing for substantial resiliency in the depending portion 67 creates the necessary frictional resistance to prevent self-rotation of the actuating assembly 48 while avoiding interference with the normal operation thereof, the tooth 68 being forced or cammed out of the groove and the clip member resiliently yielding when the handle member is rotated.

The clip member is preferably mounted under the lever handle 55 so as to be less conspicuous and avoid tampering, but this member may be located at any desired position and further, it will be clear that a plurality of clip members may be employed if desired for effecting greater friction, the latter members being arranged around the periphery of the handle member. Also, in this connection, the clip member may have a plurality of teeth rather than the single one shown.

In this form of locking means, it will also be understood that the action is automatic and requires no further substantial adjustment thereafter. It is inexpensive to make, easy to mount and replace, and yet effective in operation.

Fig. 4 shows a fragmentary portion of the valve upon which a similar clip member 63 has been mounted in reverse relation. In this form, the spring clip is secured to the bonnet 31 rather than to the handle member by means of the screw 65 within the recessed mounting lug 73 and extends upwardly terminating in the tooth or projection 74 for effecting a spring urged yieldable contact within the recesses or grooves 71, the latter lying between the serrations 70 extending around the rotatable handle member 49 rather than the bonnet as in the Fig. 1 form. In this instance, the offset 72 is outward rather than inward and is closer to the point of attachment so as to provide for the downward movement of the handle member along the outside of the bonnet as the valve is being moved to a closed position. This form of locking means operates identically to that shown in Figs. 1 to 3 and therefore further description is not believed necessary.

Figure 6:
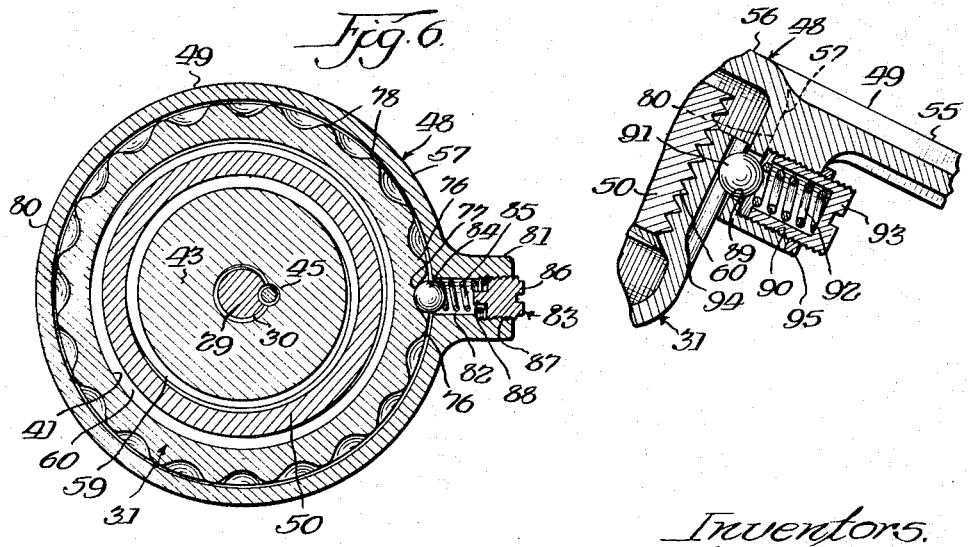
Fig. 6 is a sectional view taken on line 6—6 of Fig. 5.

Another form of locking means is shown in Figs. 5 and 6, wherein 31 designates the same type bonnet structure as that of Figs. 1 through 3 except for larger and more rounded serations 76; 49 designates the same handle member except for a longer skirt portion 80. There is the addition of a lug 81 preferably located under the lever handle 55 for the mounting therein of a spring loaded locking means generally designated 83.

The latter arrangement comprises a laterally and reciprocally movable ball element 84 and a compression coil spring 85 seating against the same and resiliently pressing it into engagement with the serrated outer peripheral portion of the bonnet for yieldable reception and locking within the recesses or grooves 77 between the serrations thereof. The ball element and spring are contained in a bore or recess 82 within the lug 81 and being retained therein at the outer end by means of a plug member 86 threadedly received within the bore at 87. The said plug member extends inwardly at 88 to better support the spring, preventing the collapse of the same and serving as a spring guide. The compression of the coil spring and the resultant frictional resistance to the rotation of the handle member 49 may be adjusted as desired by screwing the plug member in or out by virtue of the threading employed at 87.

It should be noted in Fig. 6 that the ball element 84 does not entirely fill the groove or recess 77 between adjacent serrations 76. The space on each side of this element thus provides for rocking of the same by movement of the handle 55 over either of the serrations depending upon the direction of rotation of the handle.

One of the advantages of this form of locking means is that besides being automatically applied, it is readily adjustable to any desired spring compression to permit rotation of the actuating means with a minimum of effort, while yet being effective in preventing self-opening or closing of the valve or a change of the throttle setting. Another advantage is that the locking means is almost entirely obscured from view by being internally mounted, any clicking sound also being largely muffled. It should also be noted in Fig. 6 that the ridges or crests 78 of the serrations 76 are of considerably less width and smaller radius that the recesses or grooves 77 therebetween in order to provide a greater number of grooves for smaller increments of adjustment for intermediate throttle setting.

Figure 7:
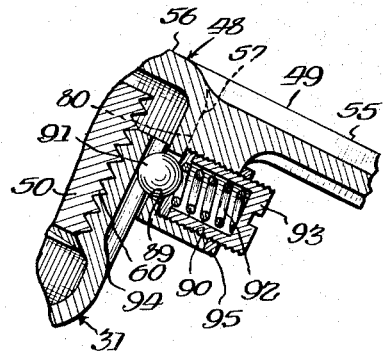
Fig. 7 is a fragmentary sectional view of a further modified form.

For more positive locking and greater frictional resistance to rotation, particularly in the larger size valves, it may, of course, be desirable to employ a larger ball element and heavier coil spring. Fig. 7 shows such an installation in which the coil spring 92 is received within a hollow cap or filler member 93 which in turn is threadedly received within a counterbored portion 90 of the aperture 89 in the skirt 80, and being retained in the desired position of adjustment therein by a lock washer 95. The larger ball element 91 which is of a diameter slightly less than the inner or restricted portion of the aperture 89 to permit movement therewithin is yieldably pressed into engagement with the outer peripheral portion of the bonnet 31 between the serrations 94 thereof by the coil spring in the same manner as explained in connection with the form shown in Figs. 5 and 6. In this structure, the serrations around the upper part of the bonnet are spaced somewhat farther apart to accommodate the larger ball element. The spring compression and resistance to rotation of the actuating means is also adjustable as it was in the form of Fig. 5.

This arrangement and the previously described locking means are preferably mounted under the lever handle 55 so as to render them safe and less conspicuous, but they may be mounted at any desired position. Moreover, a plurality of such means may be employed on either side as multiple units or equally spaced around the handle member should further resistance to accidental valve rotation be desired.

Figure 8:
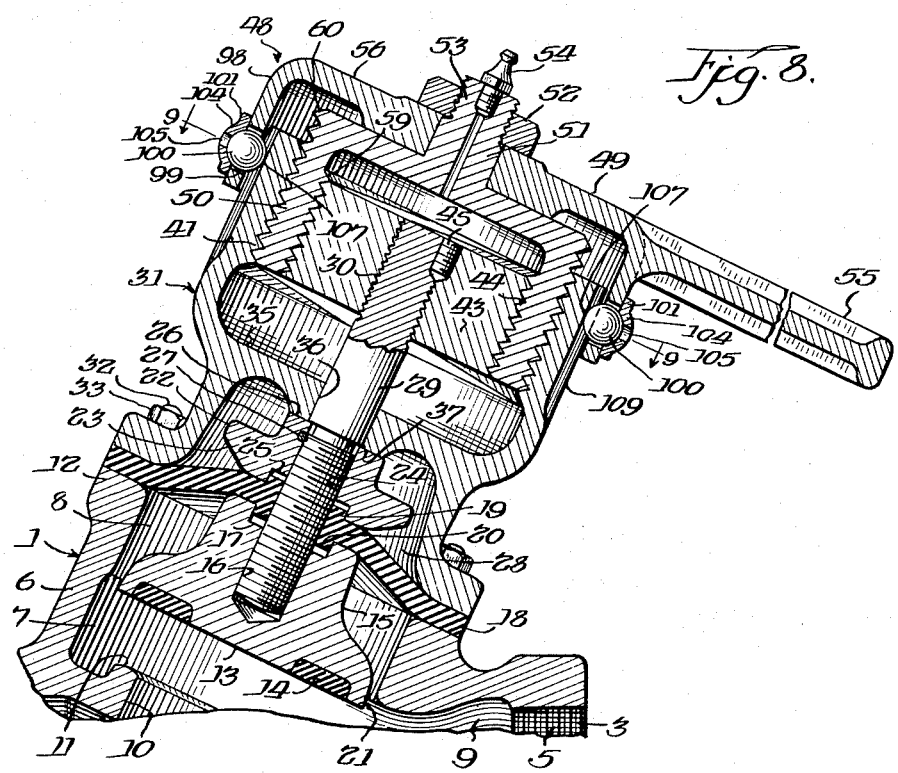
Fig. 8 is a view of a fragmentary portion of a further modified form.
Figure 9:
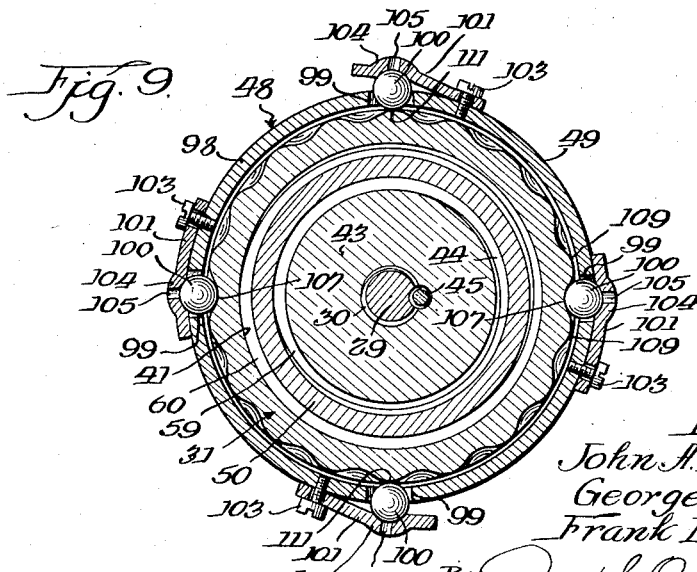
Fig. 9 is a cross-sectional view taken on line 9—9 of Fig. 8.

As to further modified forms, Figs. 8 and 9 of the drawings illustrate the use of a plurality of locking or inhibiting means, which in this instance, are equally spaced around the handle member 49. It should be particularly noted, however, that two pairs of locking means are herein employed, the ball elements of each pair being oppositely disposed to each other and so positioned with respect to the elements of the other pair that when the ball elements of one pair are within the grooves or recesses 107 between serrations 109 the elements of the other pair are riding on the ridges or crests 111 of the serrations. It should be noted that this arrangement provides for much smaller increments of adjustment for closure of the valve and for throttling of the same.

Having in mind the particular form of each of the locking or inhibiting means of Figs. 8 and 9 which may be employed singly as well as in plurality as shown, spring clip members 101 are attached to the handle member 49 at one end by suitable means, such as screws 103, and extend over the ball elements 100 received within bores or apertures 99 in the skirt portion 98 of the handle member whereby to yieldingly press the said member into locking engagement between the bonnet serrations 109. The clip members are preferably pressed out or otherwise formed in cup shape at 104 for reception of the ball elements, and the cup portion may be apertured at 105 for self-cleaning or wiping action relative to the ball elements, if desired.

It should also be noted that the clip members in this form are disposed horizontally around the handle member; however, vertical mountings may be employed if desired.

Referring to the offset relation of the plurality of ball elements for purposes of finer adjustment, this arrangement may be employed in any of previously described forms, if the ridges and grooves of the serrations are preferably made of equal width. In this connection, it will be clear that it is not necessary that four ball elements be used, but two may be employed in side by side relation, for instance.

Thus in summary, when considering the above related invention in its entirety, it will be clear that particularly applicable to the diaphragm type, a valve actuator has been devised having the characteristics of an ordinary handwheel-operated valve in that effective throttling is possible, while at the same time retaining the desirable quick-opening feature.

The present valve actuator is quickly and conveniently applied and released with the friction locks of the brake type providing sufficient locking and resistance to rotation to prevent self-opening and thus enable positive throttle control without interfering with normal operation of the valve.

Thus, control features and locking are provided which are possessed by no other valve actuator of this general type.

Although the invention has been shown and described in various forms, it is susceptible to other changes as to detail and form without departing from the spirit thereof or the scope of the appended claims.

We claim:

1. A quick-opening diaphragm valve comprising a body having a valve chamber, a flexible diaphragm defining the upper limits of said valve chamber, a valve stem extending through said diaphragm, a closure member within said valve chamber below said diaphragm and a plunger member above said diaphragm, said closure and plunger members being secured to said stem, said members also clamping said interposed diaphragm to the valve stem in substantially pressure sealed and nonrotative relation therewith, a bonnet mounted on said body around said valve chamber, said bonnet having an open top and internal means journalling said valve stem for effecting endwise reciprocal movement thereof, said plunger member being adapted to abut said stem journalling means limiting the upward movement of the said plunger member and said valve stem, diaphragm and closure member, said valve stem being journally supported at an intermediate portion thereof and extending at least the major portion of the height of said bonnet when the stem is in the upper end limit position of its reciprocal movement, said stem being provided with an enlarged portion at the upper end thereof, said bonnet being threaded around the inner periphery adjacent the open end thereof, an annular member of inverted cup shape cooperating with the said bonnet and stem, said latter annular member having inner and outer threaded portions concentrically arranged for engagement simultaneously with said enlarged end portion of the stem and the threaded inner periphery of the bonnet respectively, said enlarged stem portion being entirely receivable within said annular cup-shaped member in the valve open position to guide said stem and closure member, said cup-shaped member being receivable within the open end of the said bonnet, a handle secured to said annular cup-shaped member for effecting rotation of the latter member whereby to rotate the said stem to raise or lower said closure member depending upon the direction of said rotation, said handle having a central hub portion overlying the top of said cup-shaped member and having an annular skirt depending therefrom extending around and enclosing the outer upper portion of said bonnet, means between the annular skirt and the bonnet below the enclosed portion of the said latter member for automatically resisting rotation of the said handle and the inverted cup-shaped member.

2. In an actuating mechanism, the combination comprising a stationary housing, said housing having a hollow cylindrical portion open at one end and having internal support means therewithin, said cylindrical portion being threaded around the inner periphery thereof adjacent said open end, reciprocally movable means axially retained within said housing for movement through said support means, said movable means having an end portion threaded around the outer periphery thereof, the said reciprocally movable means being journalled within said housing below said hollow cylindrical portion, means removed from the end portion of said movable means for preventing rotation of the said means and being engageable with said internal support means to limit movement of the said movable means in one direction, rotatable means disposed over said open end of the cylindrical housing portion and having annular means extending therewithin, said annular means having inner and outer peripheral portions concentrically threaded in opposite directions for simultaneous engagement with the threaded end portion of said reciprocally movable means and said threaded inner periphery of the housing respectively whereby upon rotation of said annular means endwise movement of the said reciprocally movable means is effected, said rotatable means having an outer annular portion extending around the outside of the cylindrical portion of the said housing adjacent said open end thereof, and means thereon automatically operative between said outer annular portion and said stationary housing to resist rotation of said rotatable means, said rotatable means having an internal chamber beyond said reciprocally movable means for containing lubricant, said stationary housing being open between the annular means and said internal support means for reception of lubricant.

3. In an actuating mechanism, the combination comprising a stationary housing, said housing having a hollow cylindrical portion open at one end and a centrally bored partition within said housing, said housing being threaded around the inner periphery thereof adjacent said open end, a reciprocally movable member extending through the bore in said partition and being in bearing contact along the entire surface of the partition bore, means connected to said movable member for preventing rotation of the same and engageable with said partition for limiting the reciprocal movement of the member in one direction, said movable member having an outwardly threaded enlarged end portion, an inverted cup-shaped member, said latter member being adapted to receive said enlarged end portion of the reciprocally movable member and being received within said open end of the cylindrical housing portion, said cup-shaped member being rotatable and having inner and outer peripheral portions which are concentrically threaded in opposite directions for simultaneous engagement with said enlarged end portion of the reciprocally movable member and said threaded inner periphery of the housing respectively whereby to effect movement of said reciprocally movable member, the threading between said cup-shaped member and housing and enlarged end portion and cup-shaped member provided for accelerated rate of movement of said reciprocally movable member relative to that of the cup-shaped member upon rotation of the latter, an actuating handle secured to said cup-shaped member for effecting rotation thereof in either direction, said handle having a hub portion overlying said cup-shaped member and having an annular skirt depending therefrom extending around the outside of said cylindrical portion of the housing adjacent said open end thereof, self-locking means operative between said annular skirt and said stationary housing to automatically and yieldably secure said handle, the cup-shaped member and reciprocally movable member in selected annular positions relative to the said bonnet.

References Cited in the file of this patent

UNITED STATES PATENTS

| | | |
|---|---|---|
| 48,120 | Warner | June 6, 1865 |
| 202,319 | Worthen | Apr. 9, 1878 |
| 534,180 | Smart et al. | Feb. 12, 1895 |
| 633,217 | Qurin | Sept. 19, 1899 |
| 1,023,995 | Cole | Apr. 23, 1912 |
| 1,498,859 | Werkerle | June 24, 1924 |
| 1,696,070 | Wood | Dec. 18, 1928 |
| 1,922,190 | Atterbury | Aug. 15, 1933 |
| 2,186,833 | Iler | Jan. 9, 1940 |
| 2,216,292 | Evleth | Oct. 1, 1940 |
| 2,224,187 | Jackson | Dec. 10, 1940 |
| 2,504,057 | Trefil | Apr. 11, 1950 |
| 2,514,025 | Bush | July 4, 1950 |
| 2,610,024 | Wirth | Sept. 9, 1952 |

FOREIGN PATENTS

| | | |
|---|---|---|
| 23,961 | Great Britain | of 1913 |
| 222,302 | Great Britain | of 1924 |
| 379,726 | Germany | Aug. 28, 1923 |
| 382,102 | Great Britain | of 1932 |
| 499,832 | Belgium | of 1951 |
| 577,290 | France | of 1924 |
| 790,620 | France | of 1935 |
| 982,136 | France | of 1951 |